United States Patent
London

(10) Patent No.: US 8,271,542 B1
(45) Date of Patent: Sep. 18, 2012

(54) METADATA PRODUCER

(76) Inventor: Robert V London, Cupertino, CA (US)

( * ) Notice: Subject to any disclaimer, the term of this patent is extended or adjusted under 35 U.S.C. 154(b) by 0 days.

(21) Appl. No.: 11/619,580

(22) Filed: Jan. 3, 2007

Related U.S. Application Data

(60) Provisional application No. 60/756,047, filed on Jan. 3, 2006.

(51) Int. Cl.
  *G06F 7/00* (2006.01)
  *G06F 17/00* (2006.01)
(52) U.S. Cl. ......... 707/803; 707/800; 707/805; 707/790
(58) Field of Classification Search .............. 707/6, 790, 707/803, 805, 800; 1/1
  See application file for complete search history.

(56) References Cited

U.S. PATENT DOCUMENTS

| | | | |
|---|---|---|---|
| 5,778,364 | A | 7/1998 | Nelson |
| 5,963,965 | A | 10/1999 | Vogel |
| 6,442,545 | B1 | 8/2002 | Feldman et al. |
| 6,453,315 | B1 | 9/2002 | Weissman et al. |
| 6,532,469 | B1 | 3/2003 | Feldman et al. |
| 6,553,367 | B2 | 4/2003 | Horovitz et al. |
| 6,553,373 | B2 | 4/2003 | Boguraev et al. |
| 6,640,231 | B1 * | 10/2003 | Andersen et al. ................ 1/1 |
| 7,200,591 | B2 * | 4/2007 | Silverbrook et al. ............ 707/3 |
| 7,836,097 | B2 * | 11/2010 | Blackstone et al. .......... 707/803 |
| 2003/0217335 | A1 | 11/2003 | Chung et al. |
| 2005/0050043 | A1 * | 3/2005 | Pyhalammi et al. ............ 707/6 |
| 2006/0087668 | A1 * | 4/2006 | Takahashi .................... 358/1.13 |
| 2007/0005621 | A1 * | 1/2007 | Lesh et al. .................... 707/101 |
| 2007/0112838 | A1 * | 5/2007 | Bjarnestam et al. .......... 707/102 |

* cited by examiner

*Primary Examiner* — Paul Kim
(74) *Attorney, Agent, or Firm* — Pillsbury Winthrop Shaw Pittman LLP

(57) ABSTRACT

The present invention provides an automated metadata producer, or "markup manager." According to one aspect, the markup manager allows disparate resources to be made into useful objects by producing appropriate metadata and associating it with the original resources. In one example, a markup manager according to the invention first analyzes the original resources and outputs appropriate, descriptive metadata; then it creates a new document which includes both the metadata and an indicator to the original resource. The resource analysis and metadata production is accomplished by an algorithm in which first a "metadata schema" and a "perspective" (or facet) is selected (by the user or requesting program); then an automatic categorization step is taken where the appropriate metadata are found with respect to the selected perspective; then a transformation step is taken in which the autocategorized analyses are translated into the target metadata schema.

19 Claims, 15 Drawing Sheets

FIG. 4

```xml
<?xml version="1.0" encoding="UTF-8" ?>
<taxon:Taxonomy xmlns:taxon="http://www.taxonomize.com/schema/TRM/"
   xmlns:dc="http://purl.org/dc/elements/1.1#">
   <!-- ============================================================ -->
   <!-- ==================== About This Taxonomy ==================== -->
   <!-- ============================================================ -->
   <taxon:About>
      <dc:Title>mechanics</dc:Title>
      <dc:Subject>mechanics</dc:Subject>
      <dc:Creator>Taxonomize, Inc.</dc:Creator>
      <dc:Format>text/xml</dc:Format>
      <dc:Language>en</dc:Language>
      <dc:Rights>Copyright (C) 2007 Taxonomize, Inc.</dc:Rights>
      <dc:Description>
         <taxon:UserName>blondon</taxon:UserName>
      </dc:Description>
   </taxon:About>
   <!-- ============================================================ -->
   <!-- ======================= The Taxonomy Tree =================== -->
   <!-- ============================================================ -->
   <taxon:TaxonomyTree>
      <taxon:Category taxon:categoryID="1" taxon:categoryName="SciPhysics" taxon:categoryLabel="mechanics"
         taxon:relevanceScore="76" taxon:crossreference="false" taxon:categoryUri="">
         <taxon:CategoryDocuments>
            <taxon:DocumentReference taxon:documentID="TaxonDoc17" taxon:rawScore="2179" />
         </taxon:CategoryDocuments>
         <taxon:Subcategories>
            <taxon:Category taxon:categoryID="110" taxon:categoryName="DescriptiveMechanics"
               taxon:categoryLabel="Descriptive Mechanics" taxon:relevanceScore="69" taxon:crossreference="false"
               taxon:categoryUri="">
               <taxon:CategoryDocuments>
                  <taxon:DocumentReference taxon:documentID="TaxonDoc07" taxon:rawScore="1369" />
               </taxon:CategoryDocuments>
               <taxon:Subcategories>
                  <taxon:Category taxon:categoryID="7" taxon:categoryName="SciPhyMechanics"
                     taxon:categoryLabel="Mechanics" taxon:relevanceScore="80" taxon:crossreference="false"
                     taxon:categoryUri="">
                     <taxon:CategoryDocuments>
                        <taxon:DocumentReference taxon:documentID="TaxonDoc07" taxon:rawScore="1956" />
                     </taxon:CategoryDocuments>
                     <taxon:Subcategories>
                        <taxon:Category taxon:categoryID="48" taxon:categoryName="SciPhyGenMech"
                           taxon:categoryLabel="General Mechanics" taxon:relevanceScore="82"
                           taxon:crossreference="false" taxon:categoryUri="">
                           <taxon:CategoryDocuments>
                              <taxon:DocumentReference taxon:documentID="TaxonDoc34"
                                 taxon:rawScore="1900" />
```

FIG. 5

```
1 Descriptive Mechanics
        Mechanics
    1.1 Mechanics
            Article / Fluid Mechanics.
        1.1.1 General Mechanics
                CH Ellis SRTC4 TW General Mechanics Tool Box (GMTK)
        1.1.2 Fluid Mechanics
                fluid mechanics: Definition and Much More from Answers.com
            1.1.2.1 General Fluid Mechanics
                    Fluid Mechanics Software / Business.com
            1.1.2.2 Aerodynamics
                    Cycra Pro Mechanics Roll Cart -Black; Dennis Kirk
            1.1.2.3 Buoyancy and Hydrostatics
                    mechanics. The Columbia Encyclopedia, Sixth Edition, 2001-05
            1.1.2.4 Pressure
                    Body Mechanics / Reference
        1.1.3 Celestial Mechanics
                See 3 General Physics
        1.1.4 Forces
                mechanics - Wiktionary
        1.1.5 Ballistics
                Train for an Auto Mechanics Career at Home / pcdi.edu
        1.1.6 General Elasticity
                DOE Document - Rock mechanics
        1.1.7 Mass and Weight
                See 1 Descriptive Mechanics
        1.1.8 Torques
                Toolking.com / Mechanics Tools >> Torque Wrenches >> Ratchets >> Sockets/Extensions
2 Weights and Measures
        Albris UK: Mechanics.
    2.1 International System
            Category:Mechanics - Wikipedia, the free encyclopedia
    2.2 MKS system
            Body Mechanics / Reference
    2.3 Units
            Land Mechanics, Inc. - California - Home Improvement Pro at ServiceMagic.com
        2.3.1 Units of Area
                Molecular Mechanics
        2.3.2 Units of Length
                Drivefree Mechanics Hand Cleaner
        2.3.3 Units of Mass and Weight
                G.I. Type Camouflage Mechanics Tool Bag
        2.3.4 Units of Time
                See 2 Weights and Measures
    2.4 CGS system
```

FIG. 6

```xml
<?xml version="1.0" encoding="UTF-8" ?>
<imscp:manifest xmlns:imscp="http://www.imsglobal.org/xsd/imscp_v1p1"
    xmlns:imsmd="http://www.imsglobal.org/xsd/imsmd_rootv1p2p1" imscp:identifier="b95efda7-8fa6-4623-8207-
    e495f7c70c31" imscp:version="IMS CP 1.1.4">
 <imscp:metadata>
    <imscp:schema>IMS Content</imscp:schema>
    <imscp:schemaversion>1.1.4</imscp:schemaversion>
    <imsmd:lom>
      <imsmd:general>
        <imsmd:title>
          <imsmd:langstring>mechanics</imsmd:langstring>
        </imsmd:title>
      </imsmd:general>
    </imsmd:lom>
 </imscp:metadata>
 <imscp:organizations imscp:default="ORGANIZATION1">
    <imscp:organization imscp:identifier="ORGANIZATION1">
      <imscp:title>Table of Contents</imscp:title>
      <imscp:item imscp:identifier="ORG_TOC_1" imscp:identifierref="RESOURCE1">
        <imscp:title>Descriptive Mechanics</imscp:title>
        <imscp:item imscp:identifier="ORG_TOC_1.1" imscp:identifierref="RESOURCE7">
          <imscp:title>Mechanics</imscp:title>
          <imscp:item imscp:identifier="ORG_TOC_1.1.1" imscp:identifierref="RESOURCE8">
            <imscp:title>General Mechanics</imscp:title>
          </imscp:item>
          <imscp:item imscp:identifier="ORG_TOC_1.1.2" imscp:identifierref="RESOURCE9">
            <imscp:title>Fluid Mechanics</imscp:title>
            <imscp:item imscp:identifier="ORG_TOC_1.1.2.1" imscp:identifierref="RESOURCE14">
              <imscp:title>General Fluid Mechanics</imscp:title>
            </imscp:item>
            <imscp:item imscp:identifier="ORG_TOC_1.1.2.2" imscp:identifierref="RESOURCE15">
              <imscp:title>Aerodynamics</imscp:title>
            </imscp:item>
            <imscp:item imscp:identifier="ORG_TOC_1.1.2.3" imscp:identifierref="RESOURCE16">
              <imscp:title>Buoyancy and Hydrostatics</imscp:title>
            </imscp:item>
            <imscp:item imscp:identifier="ORG_TOC_1.1.2.4" imscp:identifierref="RESOURCE17">
              <imscp:title>Pressure</imscp:title>
            </imscp:item>
          </imscp:item>
          <imscp:item imscp:identifier="ORG_TOC_1.1.3">
            <imscp:title>Celestial Mechanics</imscp:title>
          </imscp:item>
          <imscp:item imscp:identifier="ORG_TOC_1.1.4" imscp:identifierref="RESOURCE10">
            <imscp:title>Forces</imscp:title>
```

FIG. 8

```
<?xml version="1.0" encoding="UTF-8" ?>
- <mods:mods xmlns:mods="http://www.loc.gov/mods/3">
  - <mods:titleInfo>
      <mods:title>Taxonomize Analysis Summary: mechanics</mods:title>
    </mods:titleInfo>
  - <mods:subject>
      <mods:topic>Weights and Measures</mods:topic>
      <mods:topic>CGS system</mods:topic>
    </mods:subject>
  - <mods:subject>
      <mods:topic>Weights and Measures</mods:topic>
      <mods:topic>International System</mods:topic>
    </mods:subject>
  - <mods:subject>
      <mods:topic>Weights and Measures</mods:topic>
      <mods:topic>MKS system</mods:topic>
    </mods:subject>
  - <mods:subject>
      <mods:topic>Weights and Measures</mods:topic>
      <mods:topic>Units</mods:topic>
    </mods:subject>
  - <mods:subject>
      <mods:topic>Particle Physics</mods:topic>
      <mods:topic>Particles</mods:topic>
    </mods:subject>
  - <mods:subject>
      <mods:topic>Mechanics</mods:topic>
      <mods:topic>Torques</mods:topic>
    </mods:subject>
  - <mods:subject>
      <mods:topic>Mechanics</mods:topic>
      <mods:topic>General Elasticity</mods:topic>
    </mods:subject>
  - <mods:subject>
      <mods:topic>Descriptive Mechanics</mods:topic>
    </mods:subject>
  - <mods:subject>
      <mods:topic>Units</mods:topic>
      <mods:topic>Units of Time</mods:topic>
    </mods:subject>
  - <mods:subject>
      <mods:topic>Magnetism</mods:topic>
    </mods:subject>
  - <mods:subject>
      <mods:topic>Units</mods:topic>
      <mods:topic>Units of Length</mods:topic>
    </mods:subject>
```

FIG. 10

```xml
<?xml version="1.0" standalone="no" ?>
<taxon:dc xmlns:rdf="http://www.w3.org/1999/02/22-rdf-syntax-ns#"
    xmlns:dc="http://purl.org/dc/elements/1.1#" xmlns:mods="http://www.loc.gov/mods/3"
    xmlns:taxon="http://www.taxonomize.com/schema#">
    <dc:Title>Taxonomize Analysis Summary: mechanics</dc:Title>
    <dc:Subject>CGS system</dc:Subject>
    <dc:Subject>International System</dc:Subject>
    <dc:Subject>MKS system</dc:Subject>
    <dc:Subject>Units</dc:Subject>
    <dc:Subject>Particles</dc:Subject>
    <dc:Subject>Torques</dc:Subject>
    <dc:Subject>General Elasticity</dc:Subject>
    <dc:Subject>Descriptive Mechanics</dc:Subject>
    <dc:Subject>Units of Time</dc:Subject>
    <dc:Subject>Magnetism</dc:Subject>
    <dc:Subject>Units of Length</dc:Subject>
    <dc:Subject>Electric Fields</dc:Subject>
    <dc:Subject>General Mechanics</dc:Subject>
    <dc:Subject>Forces</dc:Subject>
    <dc:Subject>Fluid Mechanics</dc:Subject>
    <dc:Subject>Ballistics</dc:Subject>
    <dc:Subject>Units of Mass and Weight</dc:Subject>
    <dc:Subject>Astrophysics</dc:Subject>
    <dc:Subject>Electromagnetism</dc:Subject>
    <dc:Subject>Mechanics</dc:Subject>
    <dc:Subject>Engines</dc:Subject>
    <dc:Subject>General Fluid Mechanics</dc:Subject>
    <dc:Subject>General Physics</dc:Subject>
    <dc:Subject>Weights and Measures</dc:Subject>
    <dc:Subject>Pressure</dc:Subject>
    <dc:Subject>Aerodynamics</dc:Subject>
    <dc:Subject>Buoyancy and Hydrostatics</dc:Subject>
    <dc:Subject>Units of Area</dc:Subject>
    <dc:Subject>Theoretical Physics</dc:Subject>
    <dc:Subject>Celestial Mechanics</dc:Subject>
    <dc:Subject>Mass and Weight</dc:Subject>
    <dc:Subject>Relativity</dc:Subject>
    <dc:Subject>Particle Physics</dc:Subject>
    <dc:Description>http://cmm.info.nih.gov/modeling/guide_documents/molecular_mechanics_document.html;
        http://del.icio.us/tag/mechanics; http://en.wikipedia.org/wiki/Category:Mechanics;
        http://en.wikipedia.org/wiki/Mechanics; http://en.wiktionary.org/wiki/Mechanics;
        http://goliath.ecnext.com/comsite5/bin/comsite5.pl?
        page=description&purchase_type=ITM&item_id=0199-520031;
        http://id.mind.net/~zona/mstm/physics/mechanics/mechanics.html;
        http://plato.stanford.edu/entries/qm/; http://scienceworld.wolfram.com/physics/Mechanics.html;
        http://scienceworld.wolfram.com/physics/QuantumMechanics.html; http://search-
        desc.ebay.com/search/search.dll?query=science+mechanics&newu=1&krd=1;
        http://shopping.yahoo.com/s:Magazines:74605-Title=Popular%20Mechanics;
```

FIG. 11

```xml
<?xml version="1.0" encoding="UTF-8" ?>
<imscp:manifest xmlns:imscp="http://www.imsglobal.org/xsd/imscp_v1p1"
  xmlns:imsmd="http://www.imsglobal.org/xsd/imsmd_rootv1p2p1" imscp:identifier="ba73b629-a07b-43E9-8B83-
  af2792841f44" imscp:version="IMS CP 1.1.4">
  <imscp:metadata>
    <imscp:schema>IMS Content</imscp:schema>
    <imscp:schemaversion>1.1.4</imscp:schemaversion>
    <imsmd:lom>
      <imsmd:general>
        <imsmd:title>
          <imsmd:langstring>mechanics</imsmd:langstring>
        </imsmd:title>
      </imsmd:general>
    </imsmd:lom>
  </imscp:metadata>
  <imscp:organizations imscp:default="ORGANIZATION1">
    <imscp:organization imscp:identifier="ORGANIZATION1">
      <imscp:title>Table of Contents</imscp:title>
      <imscp:item imscp:identifier="ORG_TOC_0" imscp:identifierref="RESOURCE1">
        <imscp:title>Science</imscp:title>
        <imscp:item imscp:identifier="ORG_TOC_1" imscp:identifierref="RESOURCE2">
          <imscp:title>Physics</imscp:title>
          <imscp:item imscp:identifier="ORG_TOC_1.1" imscp:identifierref="RESOURCE15">
            <imscp:title>Physicists</imscp:title>
          </imscp:item>
          <imscp:item imscp:identifier="ORG_TOC_1.2" imscp:identifierref="RESOURCE16">
            <imscp:title>High Energy and Particle Physics</imscp:title>
            <imscp:item imscp:identifier="ORG_TOC_1.2.1" imscp:identifierref="RESOURCE20">
              <imscp:title>Nuclear Physics</imscp:title>
              <imscp:item imscp:identifier="ORG_TOC_1.2.1.1" imscp:identifierref="RESOURCE21">
                <imscp:title>Fusion</imscp:title>
              </imscp:item>
            </imscp:item>
          </imscp:item>
          <imscp:item imscp:identifier="ORG_TOC_1.3" imscp:identifierref="RESOURCE17">
            <imscp:title>Lasers</imscp:title>
          </imscp:item>
          <imscp:item imscp:identifier="ORG_TOC_1.4" imscp:identifierref="RESOURCE18">
            <imscp:title>Physics Education</imscp:title>
          </imscp:item>
          <imscp:item imscp:identifier="ORG_TOC_1.5" imscp:identifierref="RESOURCE19">
            <imscp:title>Theoretical Physics</imscp:title>
          </imscp:item>
        </imscp:item>
        <imscp:item imscp:identifier="ORG_TOC_2" imscp:identifierref="RESOURCE3">
          <imscp:title>Technology</imscp:title>
```

FIG. 13

```xml
<?xml version="1.0" standalone="no" ?>
<taxon:dc xmlns:rdf="http://www.w3.org/1999/02/22-rdf-syntax-ns#"
    xmlns:dc="http://purl.org/dc/elements/1.1#" xmlns:mods="http://www.loc.gov/mods/3"
    xmlns:taxon="http://www.taxonomize.com/schema#">
    <dc:Title>Taxonomize Analysis Summary: mechanics</dc:Title>
    <dc:Subject>Physics States of Matter</dc:Subject>
    <dc:Subject>Electromagnetism</dc:Subject>
    <dc:Subject>Engines</dc:Subject>
    <dc:Subject>Matrix Mechanics</dc:Subject>
    <dc:Subject>General Quantum Mechanics</dc:Subject>
    <dc:Subject>General Quantum Field Theory</dc:Subject>
    <dc:Subject>Gyroscopes and Tops</dc:Subject>
    <dc:Subject>Celestial Mechanics</dc:Subject>
    <dc:Subject>Electric Fields</dc:Subject>
    <dc:Subject>Astrophysics</dc:Subject>
    <dc:Subject>Mass and Weight</dc:Subject>
    <dc:Subject>General Elasticity</dc:Subject>
    <dc:Subject>General Mechanics</dc:Subject>
    <dc:Subject>Fluid Mechanics</dc:Subject>
    <dc:Subject>Aerodynamics</dc:Subject>
    <dc:Subject>Statistical Mechanics</dc:Subject>
    <dc:Subject>Quantum Mechanics</dc:Subject>
    <dc:Subject>Ballistics</dc:Subject>
    <dc:Subject>Physics Mechanics</dc:Subject>
    <dc:Subject>General Fluid Mechanics</dc:Subject>
    <dc:Subject>Pressure</dc:Subject>
    <dc:Subject>Forces</dc:Subject>
    <dc:Subject>Particles</dc:Subject>
    <dc:Subject>Early Quantum Mechanics</dc:Subject>
    <dc:Subject>Quantum Physics</dc:Subject>
    <dc:Subject>Modern Physics</dc:Subject>
    <dc:Subject>Torques</dc:Subject>
    <dc:Subject>Schroedinger Equation</dc:Subject>
    <dc:Subject>Special Relativity</dc:Subject>
    <dc:Subject>Wave Properties</dc:Subject>
    <dc:Subject>High Energy and Particle Physics</dc:Subject>
    <dc:Subject>Physics Units and Dimensional Analysis</dc:Subject>
    <dc:Subject>Physics</dc:Subject>
    <dc:Subject>Phases of Matter</dc:Subject>
    <dc:Subject>Theoretical Physics</dc:Subject>
    <dc:Description>http://cmm.info.nih.gov/modeling/guide_documents/molecular_mechanics_document.html;
    http://del.icio.us/tag/mechanics; http://en.wikipedia.org/wiki/Category:Mechanics;
    http://en.wikipedia.org/wiki/Mechanics; http://en.wiktionary.org/wiki/Mechanics;
    http://goliath.ecnext.com/comsite5/bin/comsite5.pl?
    page=description&purchase_type=ITM&item_id=0199-520031;
    http://id.mind.net/~zona/mstm/physics/mechanics/mechanics.html;
    http://plato.stanford.edu/entries/qm/; http://scienceworld.wolfram.com/physics/Mechanics.html;
```

FIG. 15

```xml
<?xml version="1.0" encoding="UTF-8" ?>
<imscp:manifest xmlns:imscp="http://www.imsglobal.org/xsd/imscp_v1p1"
    xmlns:imsmd="http://www.imsglobal.org/xsd/imsmd_rootv1p2p1" imscp:identifier="15738632-bb3b-41D3-968C-a5b94a16e594" imscp:version="IMS CP 1.1.4">
    <imscp:metadata>
        <imscp:schema>IMS Content</imscp:schema>
        <imscp:schemaversion>1.1.4</imscp:schemaversion>
        <imsmd:lom>
            <imsmd:general>
                <imsmd:title>
                    <imsmd:langstring>mechanics</imsmd:langstring>
                </imsmd:title>
            </imsmd:general>
        </imsmd:lom>
    </imscp:metadata>
    <imscp:organizations imscp:default="ORGANIZATION1">
        <imscp:organization imscp:identifier="ORGANIZATION1">
            <imscp:title>Table of Contents</imscp:title>
            <imscp:item imscp:identifier="ORG_TOC_1" imscp:identifierref="RESOURCE1">
                <imscp:title>Industry</imscp:title>
                <imscp:item imscp:identifier="ORG_TOC_1.1" imscp:identifierref="RESOURCE6">
                    <imscp:title>Knowledge Industry</imscp:title>
                    <imscp:item imscp:identifier="ORG_TOC_1.1.1" imscp:identifierref="RESOURCE19">
                        <imscp:title>Humanities</imscp:title>
                        <imscp:item imscp:identifier="ORG_TOC_1.1.1.1" imscp:identifierref="RESOURCE23">
                            <imscp:title>Literature</imscp:title>
                        </imscp:item>
                        <imscp:item imscp:identifier="ORG_TOC_1.1.1.2">
                            <imscp:title>History</imscp:title>
                        </imscp:item>
                    </imscp:item>
                    <imscp:item imscp:identifier="ORG_TOC_1.1.2" imscp:identifierref="RESOURCE20">
                        <imscp:title>Libraries</imscp:title>
                    </imscp:item>
                    <imscp:item imscp:identifier="ORG_TOC_1.1.3" imscp:identifierref="RESOURCE21">
                        <imscp:title>Information Technology Industry</imscp:title>
                        <imscp:item imscp:identifier="ORG_TOC_1.1.3.1" imscp:identifierref="RESOURCE24">
                            <imscp:title>Computer Technology</imscp:title>
                            <imscp:item imscp:identifier="ORG_TOC_1.1.3.1.1">
                                <imscp:title>Computer Monitors</imscp:title>
                            </imscp:item>
                            <imscp:item imscp:identifier="ORG_TOC_1.1.3.1.2">
                                <imscp:title>Computer Software</imscp:title>
                                <imscp:item imscp:identifier="ORG_TOC_1.1.3.1.2.1">
                                    <imscp:title>World Wide Web Software</imscp:title>
                                    <imscp:item imscp:identifier="ORG_TOC_1.1.3.1.2.1.1">
```

FIG. 17

METADATA PRODUCER

CROSS-REFERENCE TO RELATED APPLICATIONS

The present application is based on, and claims priority from, U.S. Provisional Appln. No. 60/756,047, filed Jan. 3, 2006, the contents of which are incorporated herein by reference in their entirety.

FIELD OF THE INVENTION

The present invention is related to data organization, and more particularly to a method and apparatus for producing metadata.

BACKGROUND OF THE INVENTION

Computers enable multiple uses of digital resources, which are often organized for convenient access by various indexing methods: for example, databases, document directories, structured document libraries, or full-text indexes. Very frequently, human computer users and information consuming programs have interest in combining digital resources from varying formats, collections, and indexes. There exists no general algorithm or automated method for combining diverse digital resources for arbitrary purposes.

For digital resources to be used in combination by automated processes, there must be indications about their properties: how they are used, under what conditions, etc. These indications can be located separately and independently from the resources themselves (e.g., as associated indices, databases, or documentation), or they may be directly associated with each resource. The latter resource indications are called metadata: data that refers to other data. Metadata, for instance, provide the ground-level basis for enabling the "semantic web", currently being developed by the World Wide Web Consortium.

One example of current usage of metadata is in e-learning, as illustrated in FIG. 1. In this application as shown in FIG. 1, metadata are needed to provide structure for diverse types of resources. If educational resources can be associated with meaningful and reliable metadata, then they can be used as learning objects; that is, they can be combined into composite materials that can be used to satisfy educational goals. Generally stated: for digital educational resources to be effectively reused (arbitrarily accessed, recombined, applied in curricula), they must be associated with indications of their usage (prerequisites, grade level, assessment measures, etc.) which are typically expressed as metadata.

The pragmatic problem is how to "markup" the target resources with appropriate metadata. The current state of the art is to follow documented procedures for marking up metadata following some prescribed practices, possibly using some software tools to help guide and interactively document the process of metadata markup.

Although the overall process of using digital resources (i.e., creating, organizing, disseminating, finding, applying, and combining them) has heretofore required significant time and effort to be effective, many aspects have been accelerated and finely tuned: e.g., by full-text search, and by knowledge-management tools which aid in the task of organizing document collections. If documents have high-quality metadata, then even unstructured data (such as distributed educational resources from disparate sources) can be effectively used and reused in alternative ways. However, problems persist in getting high-quality metadata that are well associated with the resources that they are meant to describe. The main problems have been reliable tagging (consistent and reproducible methods rather than idiosyncratic), valid correspondence (stated relationships with other objects that fit with the views and perceptions of other computer users and of software tools), and evolution (reliable and valid changes of the metadata as other contextual matters change around the objects that they represent). This is still currently done by laborious processes, even when aided by commercial metadata-management software tools such as those offered by Autonomy Inc and Vivisimo Inc.

A related problem is that data standards such as "Dublin Core" ("DC," http://dublincore.org) and "Metadata Object Description Schema" ("MODS," maintained by the Library of Congress, http://www.loc.gov/standards/mods) emerge, and then change over time. Current metadata-management tools cannot adapt to multiple schema, and so different schema require different conventional tools. Also, conventional metadata markup is still too variable, difficult, and costly for people to manage efficiently and reliably. To be useful, software tools must fully automate the process, allowing people to select/modify/extend their requirements for metadata markup. Another problem is that validity of metadata will always degrade over time unless it can be automatically updated in response to changing conditions. Stated in a metaphorical way, people using Learning Objects, for example, should be enabled to act more like car drivers (selectors, connoisseurs, or managers), and less like mule drivers (overloaded and frustrated) or custom mechanics (experts in the technical innards of the objects).

Accordingly, there remains an acute and growing need in the art for an effective and completely automated process of metadata markup.

SUMMARY OF THE INVENTION

The present invention provides an automated metadata producer, or metadata "markup manager." According to one aspect, the markup manager allows heterogeneous and disparate resources to be combined into aggregated, useful objects by producing appropriate metadata and associating the metadata with the original resources. In one example, a markup manager according to the invention first analyzes the original resources; then it outputs metadata that appropriately describes the content of the resources; finally it creates a new document which includes both the descriptive metadata and an indicator to the original resource. The resource analysis and metadata production is accomplished by an algorithm in which first a "metadata schema" and a perspective (or "facet") is selected (by the user or requesting program); then an automatic categorization step is taken where the appropriate metadata are found with respect to the selected metadata schema and facet; then a filtering step is taken in which some metadata may be refined or discarded (this step may be done either by software filters or human intervention, or a combination of the two); finally metadata descriptive of the source documents/resources are produced and made available as a new type of resource for use in selecting, applying, and aggregating the sources.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 4 is a screenshot showing autocategorization of search results over the World Wide Web, as an initial step in automated metadata markup according to the invention;

FIG. 5 is a partial view of an example XML base-schema produced by the invention;

FIG. 6 shows an "outline" schema organized according to a perspective of the Library of Congress classification structure produced in accordance with aspects of the invention;

FIG. 8 shows one example metadata markup for the LOM/IMS schema, which is usable as a meta-resource document for educational usage, according to aspects of the invention;

FIGS. 10 and 11 illustrate one application of the invention to automating metadata markup for educational resources relating to physics, according to a perspective of Library of Congress classification, and produced according to "Metadata Object Description Schema" (MODS, FIG. 10) and "Dublin Core" (DC, FIGS. 11); and FIGS. 12 through 17 illustrate application of the invention to automating metadata markup for multiple perspectives. FIGS. 12 and 13 illustrate metadata markup of the same subject ("mechanics") for an alternative perspective of aerospace technology. FIGS. 14 and 15 show automated metadata markup of the same subject for a perspective of instructional curriculum. FIGS. 16 and 17 show markup for a perspective of industry and business.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to one aspect, the present invention is an automated metadata producer, or "markup manager," and is embodied as a set of functions within an overall software product running on a conventional desktop or laptop computer, using a conventional operating system such as Windows, Linux, Unix, or Apple OS X.

Figure 1:
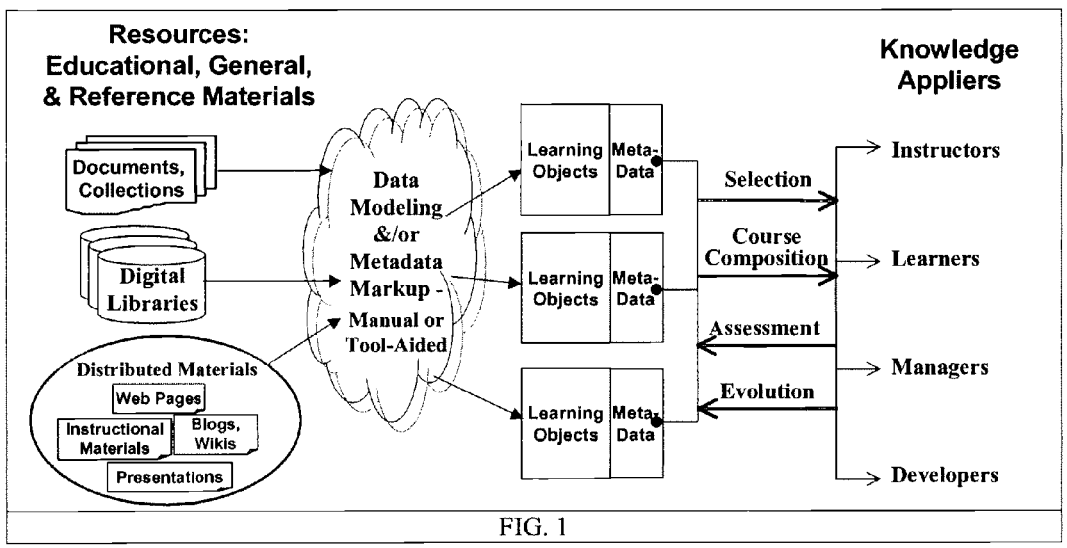
FIG. 1 is a block diagram illustrating conventional approaches to turning educational resources into learning objects.
Figure 2:
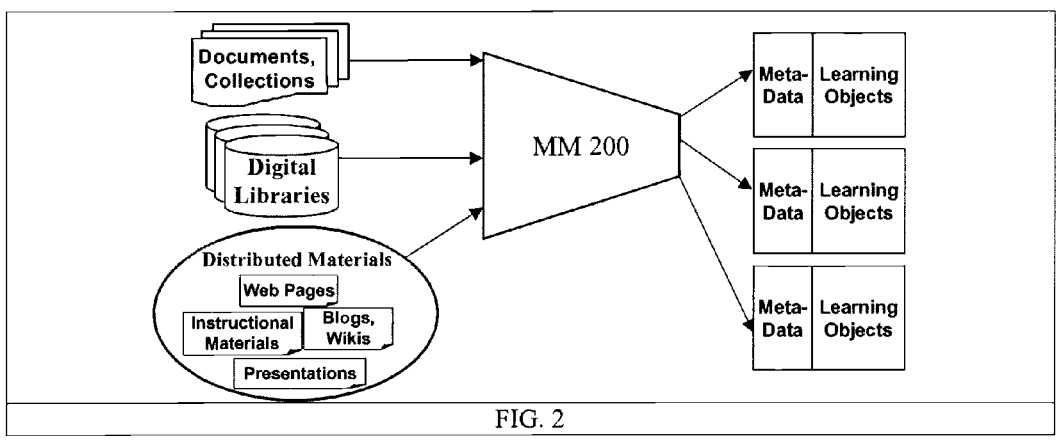
FIG. 2 is a block diagram illustrating an example automated process for metadata production in accordance with an aspect of the invention.

In an example context shown in FIG. 2 of marking up educational resources, the markup manager 200 allows disparate resources (e.g. documents, library entries, web pages, etc.) to be made into "learning objects" by producing appropriate metadata and associating it with the original resources.

In general operation, MM 200 first analyzes the original resources and outputs appropriate, descriptive metadata. Then it creates a new document which includes both the metadata and an indicator to the original resource, by a URI (universal resource indicator). The resource analysis and metadata production can include an algorithm in which first a "metadata schema" and/or "perspective" (or "facet") is selected (by the user or requesting program). Then an automatic categorization step can be taken where the appropriate metadata are found with respect to the selected perspective. Next, the synthesized metadata are translated into the selected metadata schema, associated with the original resources, and organized into a form for use as metadata which can be interoperable with other software processes such as document categorizing tools for libraries (e.g. Koha from LibLime, Concourse from Book Systems Inc., L4U from Kelowna Software, Eloquent Librarian, and Insignia Library System), and content/learning management systems (e.g. open-source tools like Sakai; courseware tools like Click2learn, Docent, Intellinex, and Saba; and training/information systems like IBM Mindspan, Intellinex, KnowledgePlanet, Learnframe, Pathlore, Plateau Systems, SmartForce, THINQ, and Vuepoint). The generation of output metadata can be accomplished by a process using a standard transformation language, for example Extensible Stylesheet Language Family Transformations (XSLT). Finally, an optional filtering step may also be taken in which some metadata may be discarded (this step may be done either by software filters or human intervention, or a combination of the two).

Figure 3:
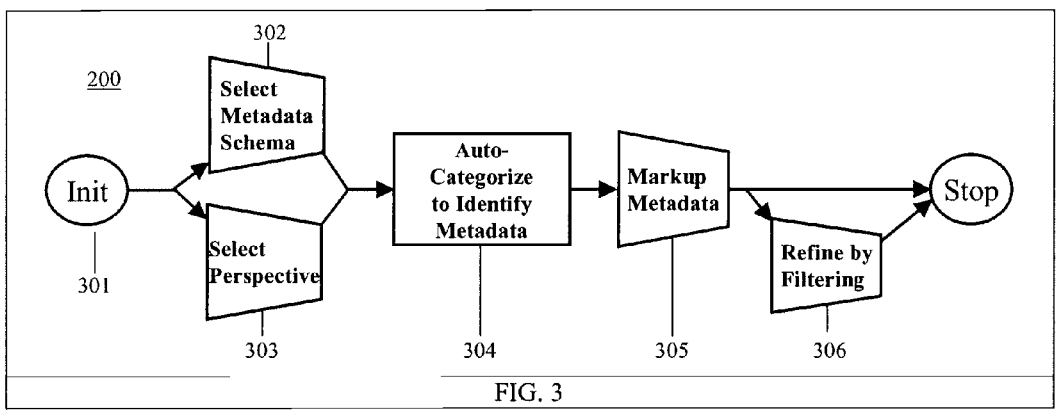
FIG. 3 is a flowchart of an example metadata manager in accordance with the invention.

An example implementation of markup manager 200 will now be described in more detail in connection with an example process flow shown in FIG. 3. As shown in FIG. 3, includes an initialization process 301, a perspective selection process 302, a metadata schema selection process 303, an autocategorization process 304, a metadata markup process 305, and an optional refinement process 306. In one preferred embodiment, the above processes are included in a single software program that can be executed in an operating environment such as MS Windows, XP, Unix/Linux, and can include a user interface for allowing selections and operations by a user or can be used as a Web Service following a REST or SOAP/WSDL protocol.

It should be noted that the above processes need not be completely sequential, and that various alternatives and substitutions can be made. Moreover, the markup manager 200 of the invention can be practiced using fewer or additional processes, and can be included in larger programs. Still further, the individual processes can be combined and separated in various ways, so the exact number and functions included in the various processes can be modified while still providing similar overall functionality. Those skilled in the art will understand various implementation alternatives after being taught by the present disclosure.

Initialization process 301: At the start of activation of MM 200, some corpus of digital resources has been selected and gathered for analysis, according to indications from the requesting user or program. The corpus may be composed of any number (one or more) documents or text streams (i.e. resources) from a variety of sources including document collections (such as directories or archives), digital libraries, targeted searches (e.g. within a Local Area Network, Wide Area Network, or the World Wide Web), from full-text search engines such as Google, specified collections of online materials (such as presentations, "weblogs," "wikis," and instructional sources), data gathering programs such as "web crawlers," or aggregations from any combination of those sources. The format of each resource may be of any decipherable type including text, HTML, RTF, Microsoft Word, Adobe Acrobat, PostScript, and other formats interpretable by an autocategorization module. In embodiments, the invention is able to receive and work with documents or text streams of any public or known format, except non-tagged graphic images. In other embodiments, the invention can operate on any corpus including combinations of documents and images. An aspect of the invention is the ability to produce automatically a detailed metadata description of the meaning of the corpus with contents possibly disparate across source locations (local or remote), source collection types, and source formats.

Next, alternative choices for the target metadata production are selected in either or both of processes 302 and 303: a metadata schema and a perspective, respectively. Additional choices relating to depth of detail and precision can also be selected. As set forth further below, the chosen schema specifies the language or dialect for the metadata markup results, while the chosen "perspective" identifies the context or specialized view for describing the content of the corpus. Selection may be made either by a human user or by software parameters from a requesting program. If the requestor does not specify a perspective for analysis or a schema for metadata output, MM 200 can supply default selections.

Examples of the metadata schema that can be selected for use with the invention include the "Dublin Core" (DC, http://dublincore.org), the "Metadata Object Description Schema" (MODS, maintained by the Library of Congress, http://www.loc.gov/standards/mods), the Sharable Courseware Object Reference Model (SCORM, http://www.adlnet.org/Scorm), and the IEEE standard1484.12.1-2002 "Learning Object Metadata" (LOM, http://ltsc.ieee.org/wg12/;, consistent with "IMS Packaging" schema, http://www.imsglobal.org/metadata).

Examples of perspectives that can be selected for use with the invention include library classification (such as Library of Congress Classification), Wikipedia open source classification structure, and curricular (e.g. organized for instructional presentation).

Selections for detail and precision may be chosen by a user or by a requesting software process. If not specified, default selections can be supplied. In selecting detail level, a low level will produce only the most important descriptors in content metadata (for example, "subject" and "topic" in the library-oriented MODS schema, or "item title" in the education-oriented IMS schema); a high level will produce more extensive metadata descriptors. The choice of precision depends on the user's interest in finding all descriptive metadata (and possibly tolerating some descriptors that are marginally relevant) versus finding the most closely germane descriptors (and avoiding any results that are less than closely relevant). A choice of high precision produces high quality descriptors but may miss some that are also relevant; a choice of low precision produces many relevant descriptors but may include some that are only slightly relevant.

Automatic categorization process 304 organizes and classifies collected resources and documents into appropriate categories and structures results in preparation for transformation into metadata schema. In embodiments, autocategorization is performed by a subroutine which is supplied by a process separate from the markup manager. Examples of autocategorization suppliers are cluster analysis programs (IDOL from Autonomy, Velocity from Vivisimo), and ontology-based programs (Cyc from Cycorp, TRA from Taxonomize). If specified by the requestor, categorization fits into the selected perspective (for example, "technology" or "industry," or "retail/commerce"), and also with selected range, precision, and level of detail corresponding to the requestor's choices. If not specified by the requestor, the algorithm can make default choices. Results of filtered categorization are expressed according to a base representation schema in Extensible Markup Language (XML). This base-schema includes the general concepts pertaining to resources and categories which can be used to map into terms of many different metadata schema. For example, the base-schema includes concepts of resources such as: title, URI, categories (including relative strength of association with each category and evidence relating the resource to the category); and concepts of categories such as: parent categories, offspring categories, textual clues and strategies for relating the category to resources. Once the autocategorization step has associated resources with the base-schema, those concepts can be used to translate into terms of target schema, e.g. "Taxon Path" of the IEEE "Learning Object Metadata" (LOM) schema.

Figure 4:
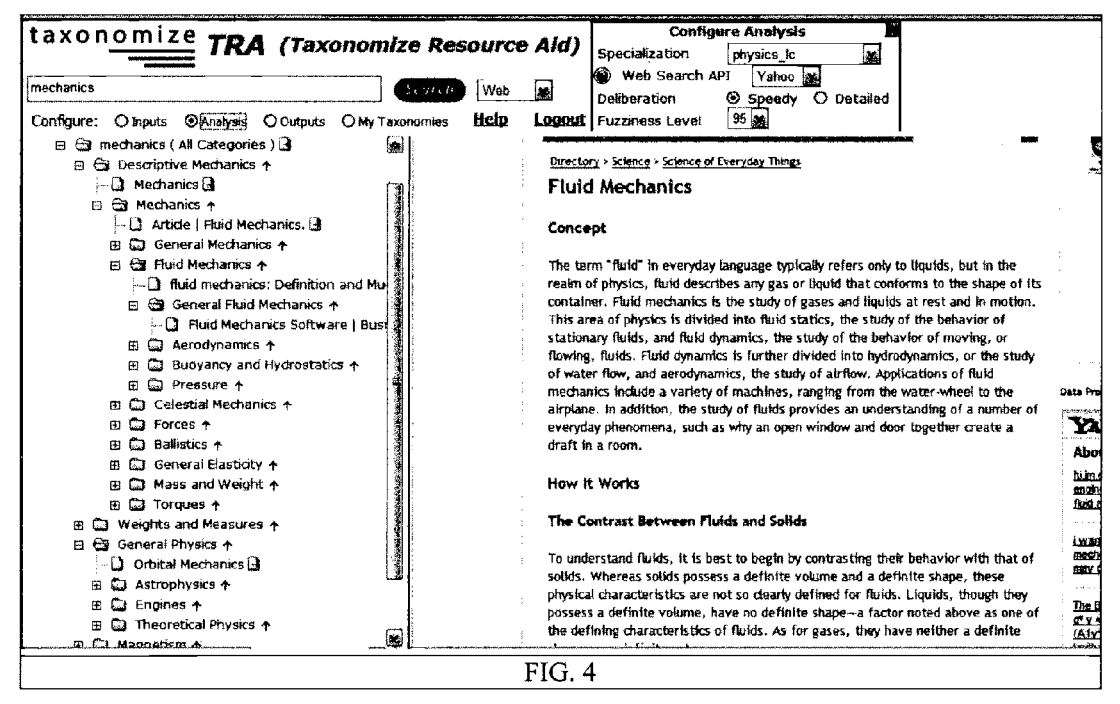

An example of a base-schema from one possible embodiment of the markup manager invention is attached as Appendix 1, which is incorporated herein by reference in its entirety. FIG. 4 illustrates the autocategorization leading to production of the base-schema representation shown in part in FIG. 5. These examples result from a sample usage of the invention in which a user invokes the markup manager prototype to gather 50 documents related to "mechanics" through a keyword search on the World Wide Web and to automatically produce descriptive metadata of the gathered corpus of documents, according to a perspective of the Library of Congress classification structure. FIG. 4 gives a partial view of the autocategorized search results; FIG. 5 gives a partial view of the XML base-schema produced by the invention, and Appendix 1 shows the base-schema for this example. FIG. 4 shows a browser window displaying the autocategorization of results of a Web search for documents relating to "mechanics," and organized according to a perspective of Library of Congress classification of books relating to physics. The left frame is a hierarchical outline of categories (shown by folder-like icons) and related documents (shown by page-like icons). The right frame shows the content of any document which is selected in the left frame.

In metadata markup process 305 metadata are produced, fitting into the targeted schema. The results in base-schema XML are transformed to conform with the target metadata schema. This step is accomplished using a standard transformation language, for example Extensible Stylesheet Language Family Transformations (XSLT). The transformation of schema is similar to language translation, because terms in different schema generally have different meanings. As in translating between human languages, some concepts can be translated precisely while others can only be translated approximately. One example of schema translation is from the invention's base-schema to a generic "outline schema" which also can serve as an intermediate form in translating into other target schema like MODS, IMS, and LOM. Appendix 2, attached to the present specification and incorporated herein by reference, gives the XSLT for translation into the outline schema, and FIG. 6 gives a partial view of a graphic representation of the outline schema for the example of describing a corpus of documents relating to "mechanics" gathered from the World Wide Web and organized according to a perspective of the Library of Congress classification structure.

The following table illustrates one example of how metadata are translated from a base-schema into the Dublin Core metadata schema. In this example, the resource's DC Subject and Description metadata are derived from the base schema's inferred categories for the resource. Some metadata elements in the DC schema are not derivable from auto-categorization analyses, such as Coverage and Rights.

TABLE 1

| DC Element | DC element description | Metadata Manager base-schema |
|---|---|---|
| Title | A name given to the resource. | Document Label: tra:label. E.g.: Title: Physics & Astronomy Lesson Plans |
| Creator | An entity primarily responsible for making the content of the resource. | Author: tra:author (taken from property or metadata of the document, or inferred by document parsing) |
| Subject | A topic of the content of the resource. | Categories: top categories for the document, from auto-categorization analysis, each listed as separate Subject: e.g., Subject: Dynamics and kinematics Subject: Atoms |
| Description | An account of the content of the resource. | Contextual category tree, from main context node. E.g., Description: Science: Physics: Mechanics: Dynamics and kinematics Description: Science: Physics: Modern Physics: High Energy and Particle Physics: Atoms |
| Publisher | An entity responsible for making the resource available | Owner: tra:owner (taken from property or metadata of the document, or inferred by document parsing) |
| Date | A date of an event in the lifecycle of the resource. | tra:date (Date of document creation, if available, else date of analysis) |
| Type | The nature or genre of the content of the resource. | "InteractiveResource" (if .htm, .html, .shtml, etc.) or "Text" (if .doc, .txt, .pdf, .ppt, etc.) |
| Format | The physical or digital manifestation of the resource. | "Text" + 'Text Media-Type' (from www.iana.org/assignments/media-types/text: html, plain, etc). E.g.:Format: Text: html |
| Identifier | An unambiguous reference to the resource within a given context. | Document's uri:uri. E.g.: Identifier: www.physics.rutgers.edu/hex/-lesson_links1.html "Taxonomize" |
| Contributor | An entity responsible for making contributions to the content of the resource. | |

Figure 7:
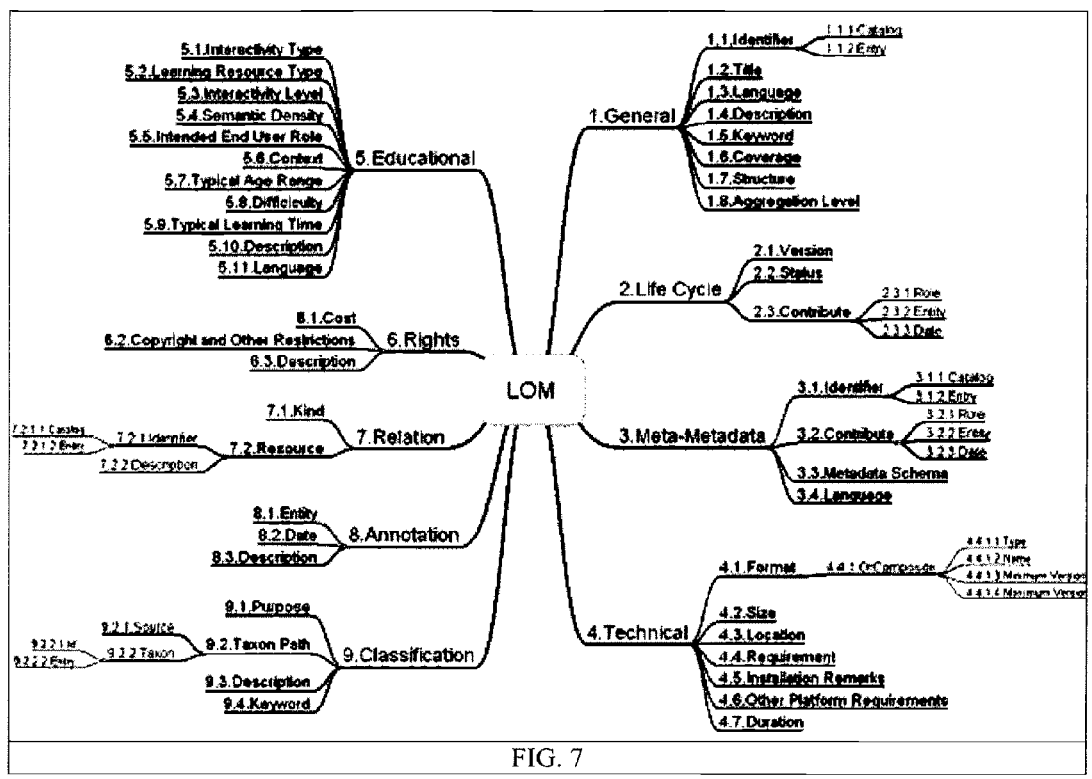
FIG. 7 illustrates IEEE LOM, an example of a data schema that the invention is able to apply in marking up metadata for resources.
Figure 9:
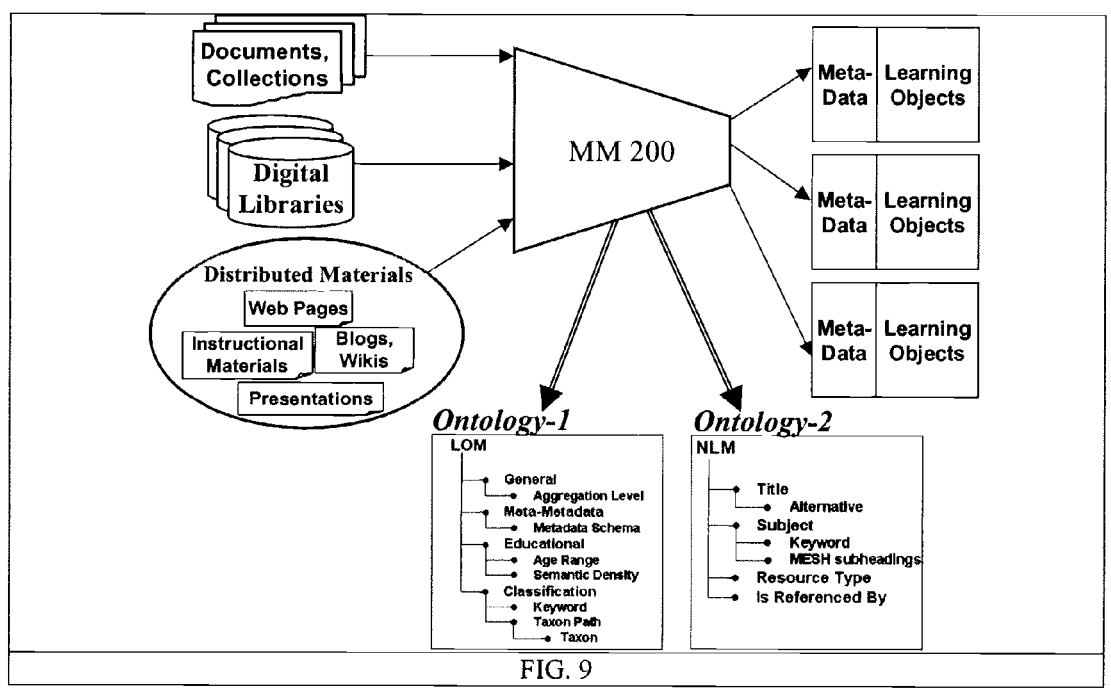
FIG. 9 is a block diagram illustrating one example of how the present invention enables automated metadata production for multiple viewpoints.

FIG. 7 illustrates a sample of part of the IEEE LOM metadata schema which MM 200 can also automatically generate for educational resources, if the IEEE LOM schema is selected. IEEE Learning Object Metadata (LOM) standard conceptual data schema can be found in *IMS Meta-data Best Practice Guide for IEEE* 1484.12.1-2002 *Standard for Learning Object Metadata*, at www.imsproject.org/metadata/mdv1p3pd/imsmd_bestv1p3pd.html (LOM is also part of the "IMS Packaging" schema for educational content). LOM illustrates an example of how hierarchical classification metadata can be generated according to an aspect of the invention. The "classification" part of LOM includes a hierarchical description of content topics (e.g. "TaxonPath 9.2" in FIG. 7 with its set of "Taxon 9.2.2"); this section of metadata can be directly translated from an "outline" schema described above. FIG. 8 shows a part of the LOM/IMS metadata schema output for the example of "mechanics" documents from the World Wide Web organized according to a Library of Congress perspective. Those skilled in the art will understand how to perform translations between a base schema and other schema after being taught by the present examples.

The transformed metadata are associated with the original resources by creating a separate document which includes both the metadata conforming to the target schema, and indicators to the original resources. This document is the metadata resource or meta-resource; in the e-learning domain, this meta-resource document can be used as the basis for an automatically produced "learning object." For example, FIG. 8 shows part of a metadata resource document for educational usage. This compilation of metadata for the document corpus can be used by learning management systems to guide instruction in the given topic of study.

It should be apparent that the present invention has many different applications other than producing useful learning objects. For example, the principles of the invention can be applied to Internet search engines and the like. In this example, the resources are generally web pages that are found using a search engine such as Google, and the metadata producer allows the search results to be automatically organized according to a schema and facet.

FIGS. 8 to 11 illustrate advantageous aspects of the invention. According to certain aspects, the same resources may be "marked up" according to one or more schema, following the choices of the requestor (a human user or a calling program). For example, as schematized in FIG. 9, MM 200 can mark up the resource with metadata confirming to the National Library of Medicine (NLM) schema, or the IEEE LOM, or both. FIGS. 5, 8, 10, and 11 show parts of the metadata resource documents automatically produced by the invention respectively for outlining, for educational usage (LOM/IMS schema), for library classification usage (MODS schema), and for general knowledge interoperation (DC schema).

Figure 12:
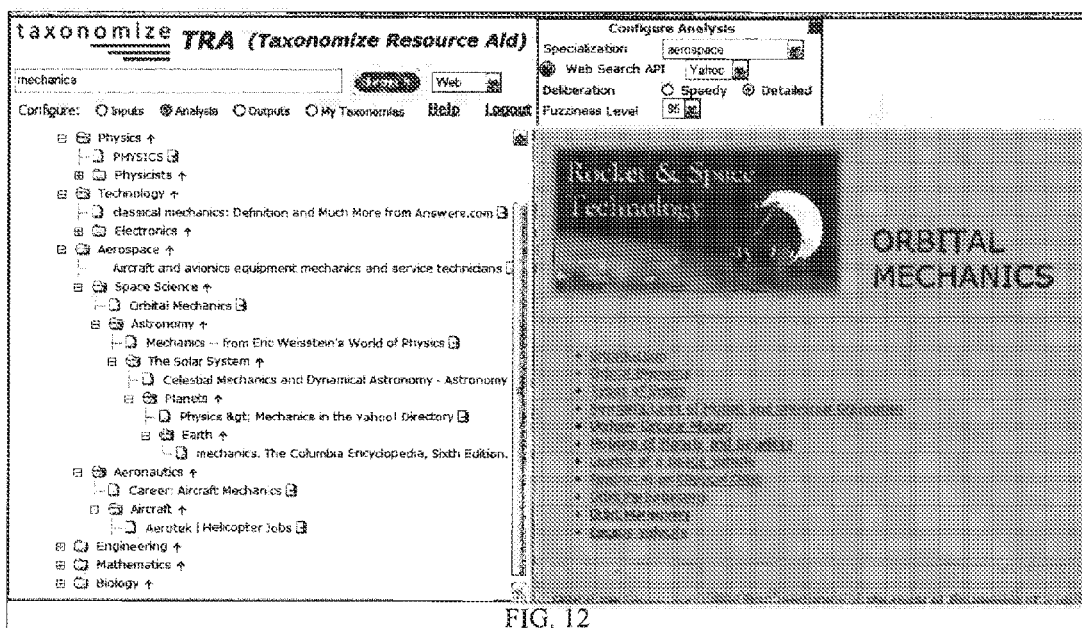
Figure 14:
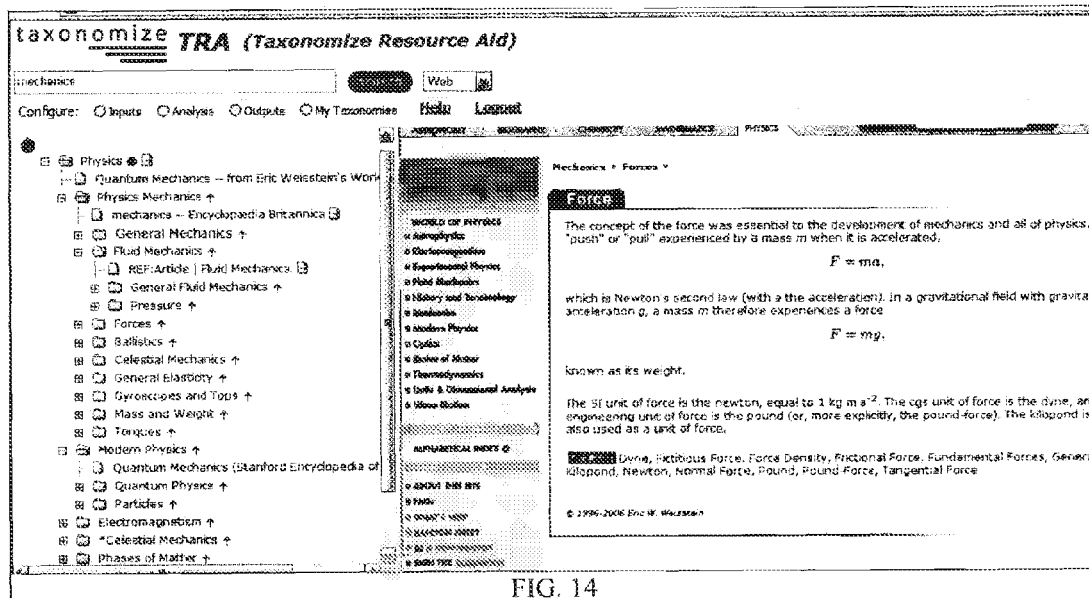
Figure 16:
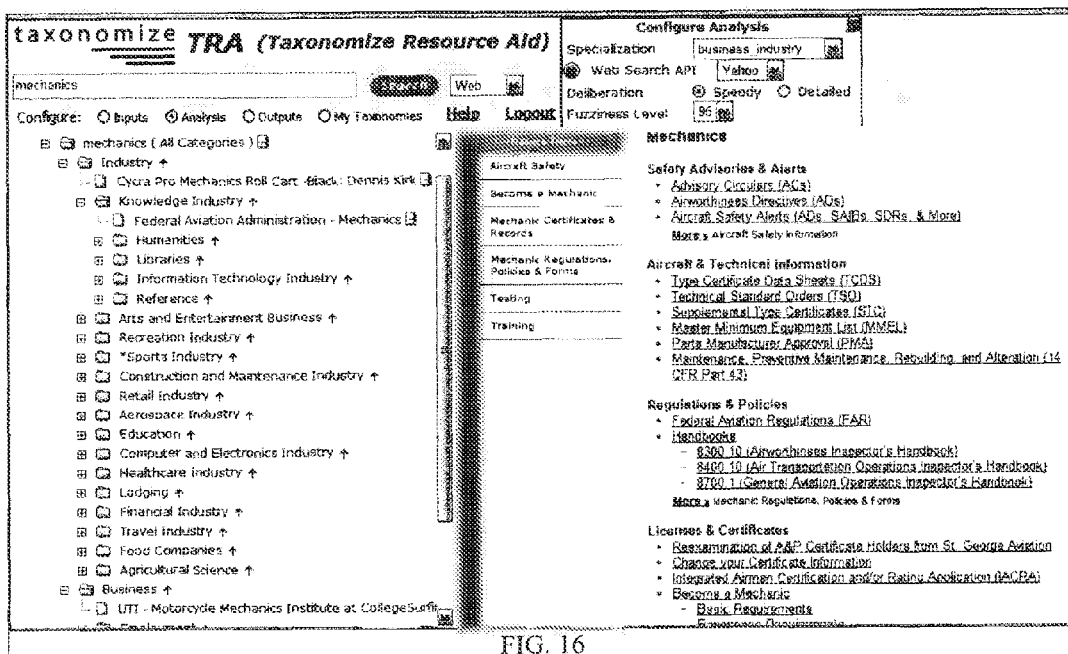

FIG. 12 through FIG. 17 show other advantageous aspects of the invention. According to these aspects, metadata markups may be done according to one or more perspectives of analysis, following the choices of the requestor. FIG. 12 is a screen shot showing part of the autocategorization of results from searching the World Wide Web for "mechanics" and organizing the results according to a perspective of the aerospace technology (as may be compared to the view of categorization by perspective of Library of Congress classification scheme, as shown in FIG. 4). FIG. 13 shows how the invention produces metadata for that set of search results, according to the metadata schema of IEEE "Learning Object Metadata" (LOM, http://ltsc.ieee.org/wg12/, also "IMS Packaging" schema, http://www.imsglobal.org/metadata). FIGS. 14 and 16 respectively show partial views of autocategorized results of Web searches for "mechanics" according to perspectives of curriculum and industry/business, and FIGS. 15 and 17 respectively show results of metadata markup for each of those perspectives, according to metadata schema of Dublin Core (DC, http://dublincore.org) and LOM/IMS.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. An apparatus, comprising one or more computer processors adapted with functional means including:
   means for receiving a data resource having a plurality of data objects;

means for categorizing the data objects of the received data resource into conceptually labeled groupings to produce a base schema corresponding to the data resource in a markup language;

means for associating a selected one of a plurality of different metadata schemas with the data resource using the base schema, each of the different metadata schemas having respectively distinct sets of terminology that are different from the base schema;

means for automatically producing metadata for each of the data objects using the selected metadata schema;

means for automatically producing a visualized representation of the data resource showing the produced metadata for the data resource using a selected one of a plurality of different perspectives, the visualized representation providing a top-down, hierarchical linked list of the data objects in the received data resource;

means for allowing a user to select the one perspective from among the plurality of different perspectives; and means for producing an exportable document that corresponds to the produced visual representation based on the user's selected perspective.

2. An apparatus according to claim 1, wherein the exportable document includes both the metadata and an indicator to the data resource.

3. An apparatus according to claim 2, wherein the means for automatically producing metadata further includes:
means for receiving a metadata perspective according to the user's selection of the perspective; and
means for automatically categorizing the data objects within the resource, wherein the produced metadata are hierarchically organized by conceptual relationship to the selected perspective.

4. An apparatus according to claim 3, further comprising:
means for translating the produced metadata to the received metadata perspective.

5. A method, comprising:
receiving a data resource having a plurality of data objects;
associating a selected one of a plurality of different metadata schemas with the received resource, each of the different metadata schemas having respectively distinct sets of terminology;
automatically producing metadata for each of the data objects using the metadata schema;
automatically producing a particularly organized and selected set of the produced metadata based on applying a selected perspective to the received resource and storing the produced metadata in a computer memory,
wherein the step of automatically producing the organized and selected set of metadata includes analytically categorizing and selecting metadata from the produced metadata into the particularly categorized and selected set of the metadata according to the perspective, and
wherein the selected perspective defines a particular structure for selecting and determining metadata for describing the resource;
associating the produced particularly organized and selected set of metadata with the data resource, thereby providing a top-down, conceptual hierarchy of properties and meanings of the data objects of the received data resource;
displaying a graphic visualization of the produced particularly organized and selected set of metadata; and
creating a document which includes both the metadata and corresponding indicators to the data objects of the original resource.

6. A method according to claim 5, wherein the step of automatically producing the particularly organized and selected set of metadata includes:
automatically categorizing the data objects within the resource.

7. A method according to claim 6, further comprising:
translating the metadata from a base schema to the selected metadata schema.

8. A computer-implemented method for managing data, comprising:
identifying one or more data sources collectively comprising a plurality of data objects;
identifying a perspective out of a plurality of different available perspectives, wherein each of the plurality of different available perspectives defines a particular structure for selecting and determining metadata for describing the data sources;
associating a selected one of a plurality of different metadata schemas with the data sources, each of the different metadata schemas having respectively distinct sets of terminology for describing data;
automatically producing metadata for each of the data objects using the selected metadata schema;
automatically producing a perspective-based metadata description of the data sources,
wherein the production of the perspective-based metadata includes analytically categorizing and selecting metadata produced according to the selected metadata schema into a particularly categorized and selected set of the metadata according to the perspective, thereby providing a top-down, conceptual hierarchy of properties and meanings of data objects in the data sources;
displaying a graphic visualization of the produced particularly organized and selected set of metadata; and
creating a document which includes both the metadata and corresponding indicators to the data objects in the data sources.

9. A method according to claim 8, wherein the step of identifying one or more data sources includes receiving a plurality of documents from a search operation.

10. A method according to claim 9, wherein the search operation includes using a search engine to locate the plurality of documents in a network.

11. A method according to claim 8, wherein the automatically associating step includes associating the data objects into a hierarchical information taxonomy according to the perspective.

12. A method according to claim 8, further comprising generating an XML file in accordance with a base representation schema, the XML file containing an organized list of the data objects and associated base metadata.

13. A method according to claim 12, wherein the step of automatically producing metadata includes translating the base metadata into the selected metadata schema.

14. A method according to claim 13, wherein translating the base metadata into the selected metadata schema is performed in accordance with an XSLT file.

15. A method according to claim 8, further comprising producing marked-up data sources corresponding to the data sources by associating the automatically produced and perspective-based metadata with the data sources.

16. A method according to claim 15, further comprising generating an indicator for the marked-up data sources.

17. An apparatus according to claim 1, wherein the plurality of data objects comprise electronic documents.

18. A method according to claim 5, wherein the plurality of data objects comprise electronic documents.

19. A method according to claim 8, wherein the plurality of data objects comprise electronic documents.

* * * * *